United States Patent [19]

Ford et al.

[11] 4,339,078

[45] Jul. 13, 1982

[54] TANK CAR COATING APPARATUS

[75] Inventors: Charles Ford, McCall Creek; Arthur Gill, Jr., Bude; John W. Smith, Meadville; Louis L. Freeman, Jr, Bude, all of Miss.

[73] Assignee: ACF Industries, Incorporated, New York, N.Y.

[21] Appl. No.: 173,552

[22] Filed: Jul. 30, 1980

[51] Int. Cl.³ .............................................. B05B 15/02
[52] U.S. Cl. ...................................... 239/1; 239/112; 239/427.5; 239/432; 366/336; 366/607
[58] Field of Search .................... 239/1, 113, 433, 8, 239/428, 112, 11, 432, 427.5; 366/607, 336; 285/114

[56] References Cited

U.S. PATENT DOCUMENTS

| 2,004,317 | 6/1935 | Forster | 239/428 X |
| 2,073,779 | 3/1937 | Bramsen | 239/1 X |
| 2,444,988 | 7/1948 | Guarnaschelli | 285/114 X |
| 3,179,341 | 4/1965 | Plos et al. | 239/428 X |
| 3,251,508 | 5/1966 | Borgs | 239/428 X |
| 4,013,272 | 3/1977 | Routson et al. | 366/607 X |
| 4,265,858 | 5/1981 | Crom et al. | 239/112 X |
| 4,281,683 | 8/1981 | Hetherington et al. | 239/112 X |

Primary Examiner—Robert B. Reeves
Assistant Examiner—Paul A. Sobel
Attorney, Agent, or Firm—Henry W. Cummings

[57] ABSTRACT

An inert solvent containing a coating material to be reacted is mixed with a liquid activator which is fed through an orifice into contact with the coating material and then into a mixing chamber. The mixing chamber is provided with special agitating means for obtaining effective mixing of the coating material with the activator. This activating means may comprise a chain held in place within the mixing chamber with washers at either end of the chamber. The mixed coating material and activator is then fed through a conduit into an applicating gun which applies the coating on a container or transportation vehicle.

13 Claims, 3 Drawing Figures

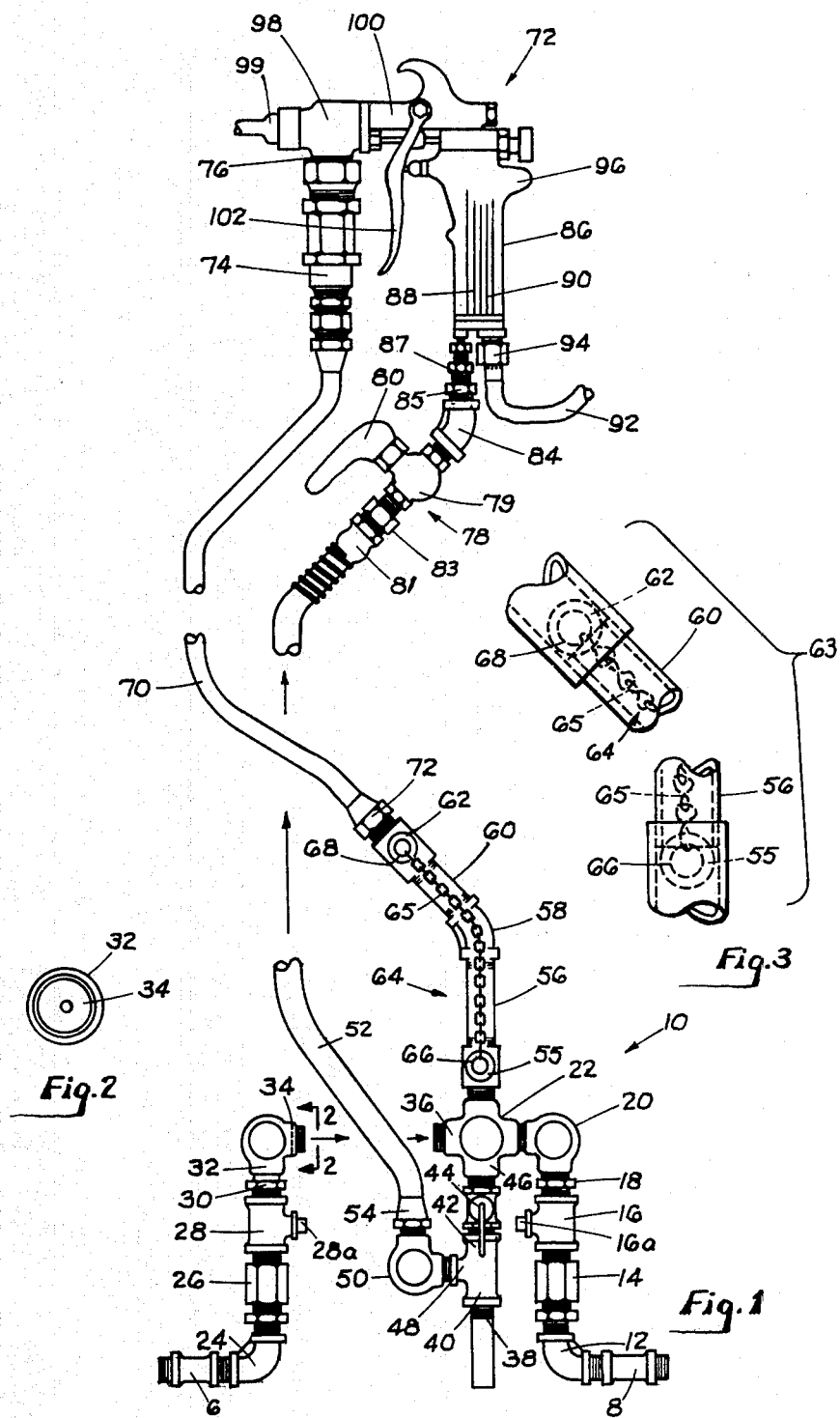

TANK CAR COATING APPARATUS

BACKGROUND OF THE INVENTION

Department of Transportation (DOT) regulations require that non-insulated pressure tank cars in flammable, compressed gas service must be thermally protected with exterior jackets, or an exterior thermal insulation coating for fire protection. This applies to vinyl chloride monomer, liquid petroleum gas, and 112 and 116 class cars. One suitable coating material is sold under the tradename Korotherm of DeSoto Manufacturing Company of Des Plaines, Ill. Containers and other transportation vehicles such as overload trucks containing hazardous chemicals must also have fire protection.

However difficulty has been encountered in applying the Korotherm material to the transportation vehicle or container with a Binks Model FMP applicator gun. This gun was found to be subject to numerous breakdowns and emitted an extremely annoying whistling noise.

SUMMARY OF THE INVENTION

An inert solvent containing the Korotherm coating material to be reacted is mixed with a liquid applicator such as containing toluene di-isocynate which is fed through an orifice into contact with the Korotherm. Preferably the Korotherm and the activator are each fed through opposite high pressure elbows of a hydraulic pipe cross and then into a mixing chamber. The mixing chamber is provided with special agitating means for obtaining effective mixing of the Korotherm material with the activator.

This activating means may comprise a chain held in place within the mixing chamber with washers at either end of the chamber. Equivalent agitating means will be apparent to the skilled in the art.

The mixed coating material is then fed through a high pressure flexible conduit into an applicating gun which applies the coating to a transportation vehicle or container to be fire protected. Conduit means are also provided to apply an inert solvent into the applicator gun under high pressure. Valve means are provided to cutoff flow of the solvent to the gun while the coating is being applied.

Conduit means are also provided to apply air pressure to the gun at moderate pressure. The air is mixed with the mixed Korotherm and activator in the gun and assists in applying this mixture to the container or transportation vehicle being coated.

BRIEF DESCRIPTION OF THE DRAWINGS

FIG. 1 is a schematic view of the coating apparatus of the present invention.

FIG. 2 is a sectional view looking in the direction of the arrows along the line of 2—2 in FIG. 1.

FIG. 3 is an enlarged detailed view of the mixing chamber utilized in the present invention.

DESCRIPTION OF PREFERRED EMBODIMENTS

A primer is applied with a standard air less spray for example Greyco 30 to 1 ratio, President, epoxy base, super Koropen coat. Application of this primer is known.

The coating apparatus of the present invention is then utilized as indicated in the drawings. The apparatus generally at 10 includes a conduit 4 extending from a container (not shown) containing Korotherm coating material, a product of DeSoto Manufacturing Company, a polyester containing methyl ethyl keytone (MEK) solvent 20%, amorphous silica 5% potassium titinate fiber 10% by volume, through a check valve 8 and into an elbow 12. This coating material is fed through an adapter 14 containing another check valve (not shown) into a ¼ inch standard pipe T and plug 16. A thread adapter 18 connects the pipe T 16 to a high pressure 90° elbow 20. The elbow in turn is threaded into a hydraulic pipe cross 22.

An activator conduit 24 including a check valve 6 is connected to an adapter 26 including another check valve (not shown). The adapter is in turn connected to another ¼ inch pipe T and plug 28. This pipe T 28 is connected through an adapter 30 to a high pressure 90° elbow 32. An orifice 34 is located within this elbow. Orifice 34 may comprise a cut off and drilled bolt. The orifice preferably has a diameter of less than 0.1 inch. Pipe T s 16 and 28 are used to weigh the coating material and the activator. A weight ratio of 4 to 1 coating material to activator is preferred. Plugs 16a and 28a are removed for the weighing operation. The elbow 32 including the orifice 34 is connected to an opposite leg 36 of a hydraulic pipe cross 22. The coating material and the activator thus meet head on in the pipe cross 22.

Another conduit 38 extends to a container (not shown) containing methyl ethyl keytone (MEK) inert solvent. The conduit 38 is connected to a ¼ inch pipe T 40. One leg 42 of the pipe T is connected to a ¼ inch stainless steel manually operable ball valve 44. This valve is used to control the flow of MEK into the pipe cross 22. This in turn is connected to a leg 46 of the hydraulic pipe cross 22 to enable the inert solvent to be fed into pipe cross 22. Another leg 48 of the elbow 40 is connected to a 90° elbow 50. The elbow 50 in turn is connected to a flexible conduit 52 by means of an appropriate collar 54. In use, the pipe cross is conveniently connected to the belt of the operator (not shown).

An adapter 55 connects the pipe cross 22 with a mixing pipe 56. A 45° elbow 58 is connected to conduit 56 for applicator convenience, and another mixing pipe 60 is attached to this elbow. The pipe 60 is then connected to an adapter 62. A mixing chamber 63 is thus defined between the adapters 55 and 62. Agitating means 64 are provided within the mixing chamber. This agitating means preferably comprises a chain 65 of suitable length which is held in place with washers 66 and 68, attached to opposite ends of the chain. The washers are preferably located in line with the fluid direction to avoid blocking of the fluid. This assembly has been particularly adapted to affect substantially complete mixing of the activator with the Korotherm coating material. The reaction of activator and coating material is thus in progress. By disassembling the adapters 62 and 55 it is possible to periodically replace the chain as wear occurs. If desired the mixing chamber pipes may be directly threaded into pipe cross 22 and a collar 72.

A flexible conduit 70 is connected by means of collar 72 to the mixing chamber 63. This flexible conduit carries the mixed coating material into the Binks Model 18 coating applicator gun 72. One or more adapters 74 are utilized to connect the conduit 70 with a cylindrical portion 76 of the gun. The flexible portion 70 is of the order of three to four feet in length and is conveniently a ⅜ inch diameter high pressure hose.

Flexible conduit 52 preferably comprises a 3/16 inch 3000 PSI hose which also is of three to four feet in length. This hose is connected to a valve means 78 with adapters 81 and 83; for example, a ball valve 79 manually operable and having a handle 80. The valve means 78 is thus effective in one position to shut off the inert solvent or re-establish communication between the conduit 54 and the gun 72. A 40° elbow 84 and adapters 85 and 87 connect the valve means 78 to depending leg portion 86 of the gun 72.

Depending leg portion 86 includes a first conduit portion 88 for carrying the inert solvent and a second conduit portion 90 adopted to carry air. An airline 92 or conduit from pressure of approximately 100 PSI is connected to a depending leg portion 86 with an appropriate nut or collar 94.

The gun is preferably made of a corrosion resistant steel such as Nitralloy. The components of the gun which withstand wear should be made of Tungsten Steel or Nitraalloy. The air cap is preferably made of Tungsten Steel, the air tip of Nitralloy, and the gun needle of Nitralloy.

Conduit portions 88 and 90 merge into a gun chamber 96. The mixed coating material makes a right angle bend in the chamber 98 and passes out the barrel. The air propels the solvent into cylindrical cavity 100 which is in communication with chamber 96 and barrel 99. Thus a mixture occurs between the solvent and the mixed coating material comprising Korotherm and activator in the chamber 98. Air is utilized to propel the mixture towards the container to be coated through barrel 99.

Valve means 78 is used to turn off the inert solvent when the gun is in operation, and is utilized to re-establish flow of the inert solvent into the gun as soon as the coating material is no longer being applied. Valves 6 and 8 must be turned to closed position quickly to avoid activator and coating material setting up in the line 70 and gun 72. After valves 6 and 8 are closed, valve 44 is opened to allow inert solvent material to enter the pipe cross 22 and the mixing chamber 56 and the conduit 70 to prevent activator and coating material reacting and setting up in this portion of the apparatus. A handle 102 on the gun is utilized to control application of air and hence the coating material to the container in a known manner.

It is to be stressed that the Binks Model 18D is a commercially available coating applicator gun. The remainder of the assembly is made of inexpensive shelf items.

However an important feature of the present invention is the use of agitating means 64 in the mixing chamber 63 such as a chain 65 to achieve effective mixing of the activator with the coating material.

Furthermore the use of a hydraulic pipe cross 22 and the orifice 34 which provides direct impingement of the activator upon the coating material is also a valuable inexpensive mixing aid.

A top coat of Super Desothane Urethane, enamel base, an aliphater urethane is subsequently applied. The thus coated car will withstand 1200° to 1600° F. impinged heat for a short time. A non-coated car will explode in about 15 minutes. With the coating of the present invention explosion takes place in about 97 minutes. This is adequate time for fire fighting equipment to arrive on the scene, put out the fire and prevent an explosion.

What is claimed is:

1. Coating apparatus comprising:
first conduit means for carrying an inert solvent containing a coating material to be reacted into a mixing chamber; second conduit means for carrying a liquid activator in a particulate state to be reacted with the coating material into said mixing chamber; third conduit means for carrying an inert solvent for said coating material and activator into said mixing chamber; said coating material and said activator being fed into a mixing chamber into intimate contact in said mixing chamber; said mixing chamber being provided with agitating means for obtaining effective mixing of the coating material with the agitator; fourth conduit means for feeding the mixed coating material, solvent and activator into a coating applicator gun; valve means in said third conduit means for preventing flow of said inert solvent into said mixing chamber during said coating operation and allowing flow of inert solvent into said mixing chamber after said coating operation; fifth conduit means extending from said valve means and connected to a rear portion of said gun for carrying inert solvent into the rear portion of said gun; said gun comprising means for applying the mixed coating material and activator onto a container or transportation vehicle; second valve means in said fifth conduit means for preventing flow of said inert solvent into said rear portion of the gun during said coating operation and allowing flow of inert solvent into said gun after said coating operation.

2. Coating apparatus according to claim 1, wherein sixth conduit means are provided for applying air pressure to said gun.

3. Coating apparatus according to claim 2, wherein said high pressure air and said inert solvent meet in a mixing chamber in said gun and wherein said mixed coating material is applied with said air pressure.

4. Coating apparatus according to claim 1, wherein said agitating means comprises at least one chain.

5. Coating apparatus according to claim 4, wherein said chain agitating means is held in place with washers at either end of the chamber.

6. Coating apparatus comprising:
first conduit means for carrying an inert solvent containing a coating material to be reacted into a mixing chamber; second conduit means for carrying a liquid activator in a particulate state to be reacted with the coating material into said mixing chamber; third conduit means for carrying an inert solvent for said activator and coating material; said first conduit means and said second conduit means being connected to opposite inlets of a hydraulic pipe cross extending into said mixing chamber; said mixing chamber being provided with chain agitating means for obtaining effective mixing of the coating material with the activator; fourth conduit means for feeding the mixed coating material and activator into a coating applicator gun; fifth conduit means extending from said valve means and connected to a rear portion of said gun for carrying inert solvent into the rear portion of said gun; said coating applicator gun comprising means for applying the mixed coating material and activator onto a container or transportation vehicle; first valve means in said third conduit means for preventing flow of said inert solvent into said mixing chamber during a coating operation and allowing flow of inert solvent after said coating operation to prevent set-up in said fourth conduit means; and second valve means in said fifth conduit means for preventing flow of said inert solvent into said rear portion of the gun during said coating operation and allowing flow of inert solvent into said gun after said coating operation.

7. Coating apparatus according to claim 6, wherein said pipe cross also includes an inlet for receiving said third conduit means.

8. Coating apparatus according to claim 7, wherein said chain means is held in place with washers at either end of the chamber.

9. A method of mixing and coating comprising: providing a first conduit containing a coating material into a mixing chamber; feeding a liquid activator for said coating material into said mixing chamber in a particulate state through a second conduit; feeding an inert solvent for said activator and coating material into said mixing chamber through a third conduit after said activator and inert solvent have been turned off; mixing said coating material and liquid activator in said mixing chamber with agitating means effective to mix said coating material with said activator, feeding said mixed coating material and activator into a coating applicator gun through a fourth conduit; and also feeding inert solvent into the rear portion of the gun through a fifth conduit to prevent the coating material from coming into the gun after said activator and coating material have been turned off.

10. A method according to claim 9, wherein said activator is fed through an orifice to render it in a particulate state prior to entering said mixing chamber.

11. A method according to claim 9, wherein when the mixture of activator and coating material is turned off, said inert solvent is fed through said gun.

12. A method according to claim 9, wherein said coating material and said activator are mixed in a chamber containing an agitating chain.

13. A method according to claim 12 wherein said coating material and said activator are fed into said mixing chamber through conduits located approximately 180 degrees apart.

* * * * *

UNITED STATES PATENT AND TRADEMARK OFFICE
CERTIFICATE OF CORRECTION

PATENT NO. : 4,339,078
DATED : July 13, 1982
INVENTOR(S) : Charles Ford, et.al.

It is certified that error appears in the above-identified patent and that said Letters Patent are hereby corrected as shown below:

In column 3, line 8, please change "40°" to --45°--.

Signed and Sealed this

Twelfth Day of July 1983

[SEAL]

Attest:

GERALD J. MOSSINGHOFF

Attesting Officer

Commissioner of Patents and Trademarks